United States Patent [19]
Nakajima

[11] Patent Number: 6,091,534
[45] Date of Patent: Jul. 18, 2000

[54] COMPACT SCANNING OPTICAL SYSTEM

[75] Inventor: Tomohiro Nakajima, Tokyo, Japan

[73] Assignee: Ricoh Company, Ltd., Japan

[21] Appl. No.: 09/264,728

[22] Filed: Mar. 9, 1999

Related U.S. Application Data

[63] Continuation of application No. 08/781,282, Jan. 10, 1997, Pat. No. 5,936,756.

[30] Foreign Application Priority Data

Jan. 10, 1996 [JP] Japan ..................................... 8-002406

[51] Int. Cl.$^7$ ...................................................... G02B 26/08
[52] U.S. Cl. ......................... 359/208; 359/205; 359/207; 347/256
[58] Field of Search ..................................... 359/205, 206, 359/207, 208; 347/256, 257, 258, 259, 260, 261; 235/462.32, 462.33, 462.35, 462.36, 462.37, 462.38, 462.39, 462.4

[56] References Cited

U.S. PATENT DOCUMENTS

| | | | |
|---|---|---|---|
| 3,873,180 | 3/1975 | Bousky | 359/205 |
| 4,054,361 | 10/1977 | Noguchi | 359/208 |
| 4,759,593 | 7/1988 | Kessler | 359/208 |
| 5,699,180 | 12/1997 | Urakawa et al. | 359/205 |

*Primary Examiner*—Cassandra Spyrou
*Assistant Examiner*—Darren E. Schuberg
*Attorney, Agent, or Firm*—Knoble & Yoshida LLC

[57] ABSTRACT

A compact optical system for and method of forming an image on an intermediate image-forming surface such as a photoreceptor drum at a high speed. An image-forming light source such as a laser light source is placed between an image-focusing element such as a focusing mirror and an image-scanning unit such as a polygon mirror. According to one preferred embodiment, the image-forming light source is placed in a scanning area defined by a predetermined scanning angle of the image scanning unit.

17 Claims, 6 Drawing Sheets

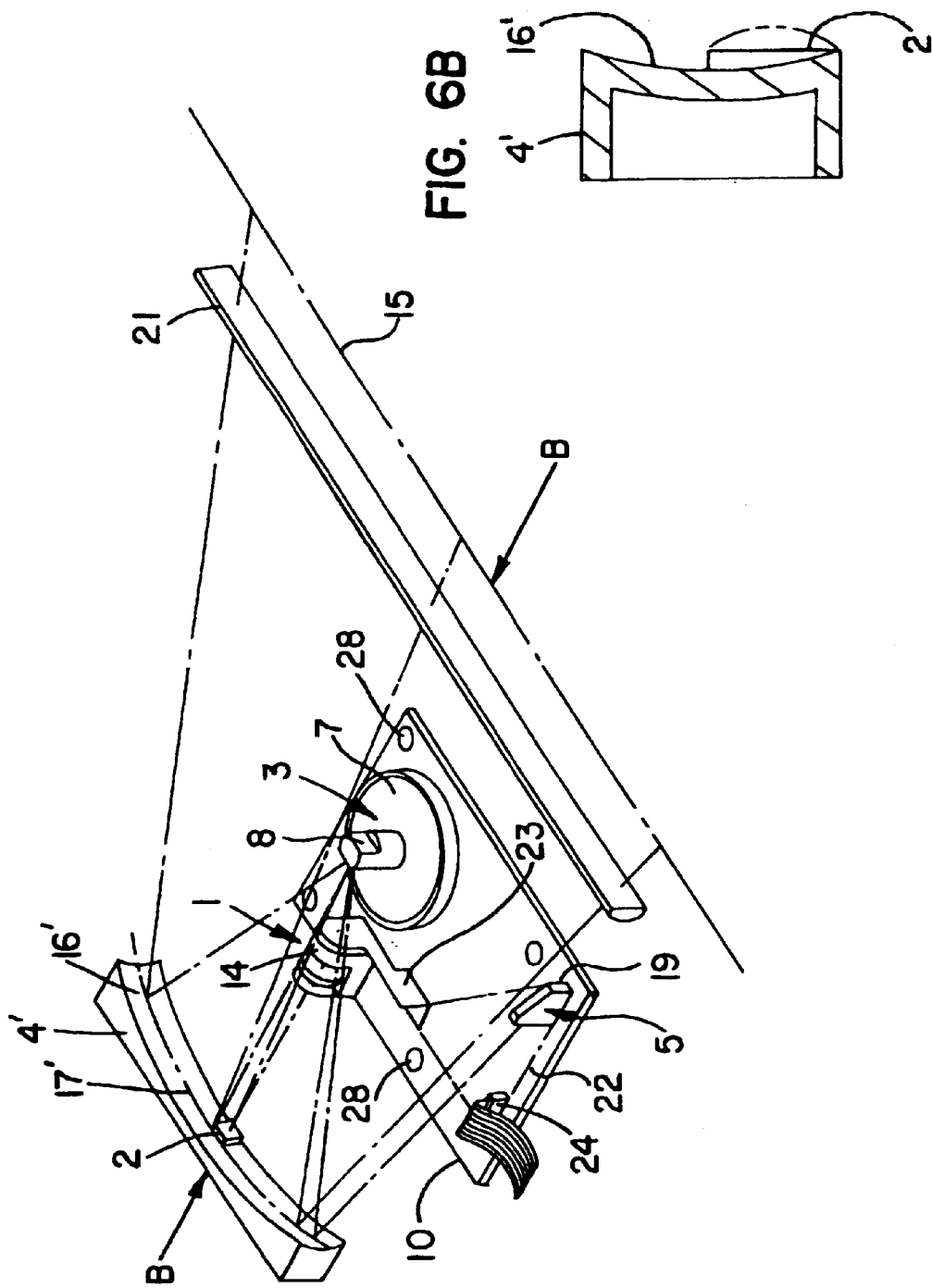

COMPACT SCANNING OPTICAL SYSTEM

RELATED APPLICATION DATA

This application is a continuation of application Ser. No. 08/781,282, now U.S. Pat. No. 5,936,756, filed Jan. 10, 1997.

FIELD OF THE INVENTION

The current invention is generally related to a method of and a system for providing a compact optical system and more particularly related to a method of arranging scanning optical components in a compact space and a compact optical system having a light source located between an image-reflecting surface such as a polygon mirror and an image-focusing element such as a focusing mirror.

BACKGROUND OF THE INVENTION

An optical system is used in image duplication devices such as facsimile machines, copiers and printers. In general, the optical system is housed in a single housing unit and is located near an intermediate image-forming surface such as a photoreceptor drum. The optical system includes an image-forming light source, an image-reflecting surface and an image-focusing element to form a desired image on the intermediate image-forming surface by repeatedly scanning the image-forming light in a predetermined direction. To accomplish an efficient scanning, the image-reflecting surface has multiple reflecting surfaces and is rotated at a high speed. The light source is located at a certain distance from the rotatable reflecting surface at a predetermined angle so that a desired scanning angle is obtained. For these and other reasons, the above described prior art optical housing unit generally takes a certain amount of space.

In the efforts to manufacture compact duplication devices, the above described optical system or housing unit needs to be reduced in size. Referring to FIG. 1, one prior art attempt in reducing the overall size of the optical housing unit includes Japanese Patent 5-19196 which discloses an optical housing unit 50 whose mounting portions 51A, 51B and 51C are located inside the optical housing unit 50. Thus, space occupied by otherwise protruding mounting portions 51A–51C is saved, and the overall housing unit size is reduced.

Still referring to FIG. 1, Japanese Patent 5-19196 further discloses a light source 1 located adjacent to a rotatable image-reflecting surface 8 so as to reduce the overall size of the housing unit 50. The light source 1 emits an image-forming light towards the rotating image-reflecting surface 8 which scans the light within a predetermined scanning angle through an image-focusing lens 4. The scanned light is thus focused on a predetermined intermediate image-forming surface by a focusing lens 4 to form a desirable image thereon. However, a certain predetermined distance must be provided between the reflecting surface 8 and the image focusing element 4. Additionally, the relative position of the light source 1 is inflexible with respect to the position of the rotatable reflecting surface 8. In other words, the light source 1 must be placed outside of the scanning angle of the rotatable reflecting surface 8, and a relatively large angle of incidence of the incoming light on the reflecting surface 8 also must be maintained. Consequently, the reflecting surface area needs to be relatively large. For these reasons, the overall housing unit size is not substantially reduced.

Referring to FIG. 2, another prior art effort as disclosed in Japanese Patent 6-148541 employs an additional reflecting surface 60 between a light source 1 and a rotatable reflecting surface 8 for modifying an angle of the originally emitted light by the light source 1. The use of the angle modifying reflecting surface 60 allows the positional arrangement of the light source 1 and the rotatable reflecting surface 8 to be more flexible. However, the above described large angle of incidence as well as a large reflecting surface area on the rotatable reflecting surface must be still provided to form a desirable image.

In view of the above prior art, a flexible compact optical system is desired for various duplication devices of a further reduced size.

SUMMARY OF THE INVENTION

In order to solve the above described and other problems, according to one aspect of the current invention, one method of projecting image-forming light onto a temporary image-forming surface via a rotatable image-reflecting surface and an image-focusing element, includes the following steps of: a) placing an image-forming light source in an area defined by a predetermined scanning angle of the rotatable image-reflecting surface and located between the rotatable image-reflecting surface and an image-focusing element; b) projecting the image-forming light towards the rotatable image-reflecting surface; c) scanning the image-forming light towards the image-focusing element while rotating the rotatable image-reflecting surface; and d) focusing the image-forming light reflected by the rotatable image-reflecting surface onto the temporary image-forming surface.

According to a second aspect of the current invention, a method of projecting image-forming light onto a temporary image-forming surface via a rotatable image-reflecting surface and an image-focusing element, the image-focusing element having a reflector portion for reflecting the image-forming light, includes the following steps of: a) placing an image-forming light source in an area defined by an extent of the rotatable image-reflecting surface and an image-focusing element; b) projecting the image-forming light towards the reflector portion which reflects the image-forming light towards the rotatable image-reflecting surface; c) scanning the image-forming light towards the image-focusing element while rotating the rotatable image-reflecting surface; and d) focusing the image-forming light reflected by the rotatable image-reflecting surface onto the temporary image-forming surface.

According to a third aspect of the current invention, a system for projecting image-forming light onto a temporary image-forming surface, includes: an image-focusing element for focusing the image-forming light onto the temporary image-forming surface; a rotatable image-reflecting surface located near the image-focusing element for reflecting the image-forming light and for scanning the image-forming light within a predetermined scanning angle towards the image-focusing element while rotating the rotatable image-reflecting surface; and an image-forming light source located in an area defined by the predetermined scanning angle and an extent of the rotatable image-reflecting surface and the image-focusing element for projecting the image-forming light towards the rotatable image-reflecting surface.

According to a fourth aspect of the current invention, a compact optical system for projecting image-forming light onto a photoreceptive drum surface, includes: a fθ mirror having a curved reflective surface for focusing the image-forming light so as to form an image on the photoreceptive drum surface, the image-focusing element also having an integral reflector portion for reflecting the image-forming light; a rotatable polygon mirror located near the fθ mirror for reflecting the image-forming light towards the fθ mirror and for scanning the image-forming light towards the fθ mirror while the polygon mirror is being rotated; and an image-forming light source located in an area defined by an extent of the rotatable polygon mirror and the fθ mirror for projecting the image-forming light towards the reflector portion which reflects the image-forming light towards the polygon mirror.

According to a fifth aspect of the current invention, a single component board used in a compact optical system, includes: a rotatable image-reflecting surface located on the single component board for reflecting an image-forming light so as to scan the image-forming light within a predetermined scanning angle while rotating the rotatable image-reflecting surface; and an image-forming light source located on the single component board in an area defined by the predetermined scanning angle for projecting the image-forming light in a predetermined direction with respect to the rotatable image-reflecting surface.

According to a fifth aspect of the current invention, an image-focusing element used in a compact optical system, includes: an image-focusing surface for forming an image on a predetermined surface in response to an incoming image-forming light; and a reflector portion located on the image-focusing surface for directly reflecting the incoming image-forming light in a predetermined direction.

These and various other advantages and features of novelty which characterize the invention are pointed out with particularity in the claims annexed hereto and forming a part hereof. However, for a better understanding of the invention, its advantages, and the objects obtained by its use, reference should be made to the drawings which form a further part hereof, and to the accompanying descriptive matter, in which there is illustrated and described a preferred embodiment of the invention.

BRIEF DESCRIPTION OF THE DRAWINGS

FIG. 6A illustrates a perspective view of another preferred embodiment of the compact optical system according to the current invention.

FIG. 6B illustrates an enlarged cross-sectional view of a mirror and an image-focusing element as taken at a line B—B of FIG. 6A.

DETAILED DESCRIPTION OF THE PREFERRED EMBODIMENT(S)

Figure 3:
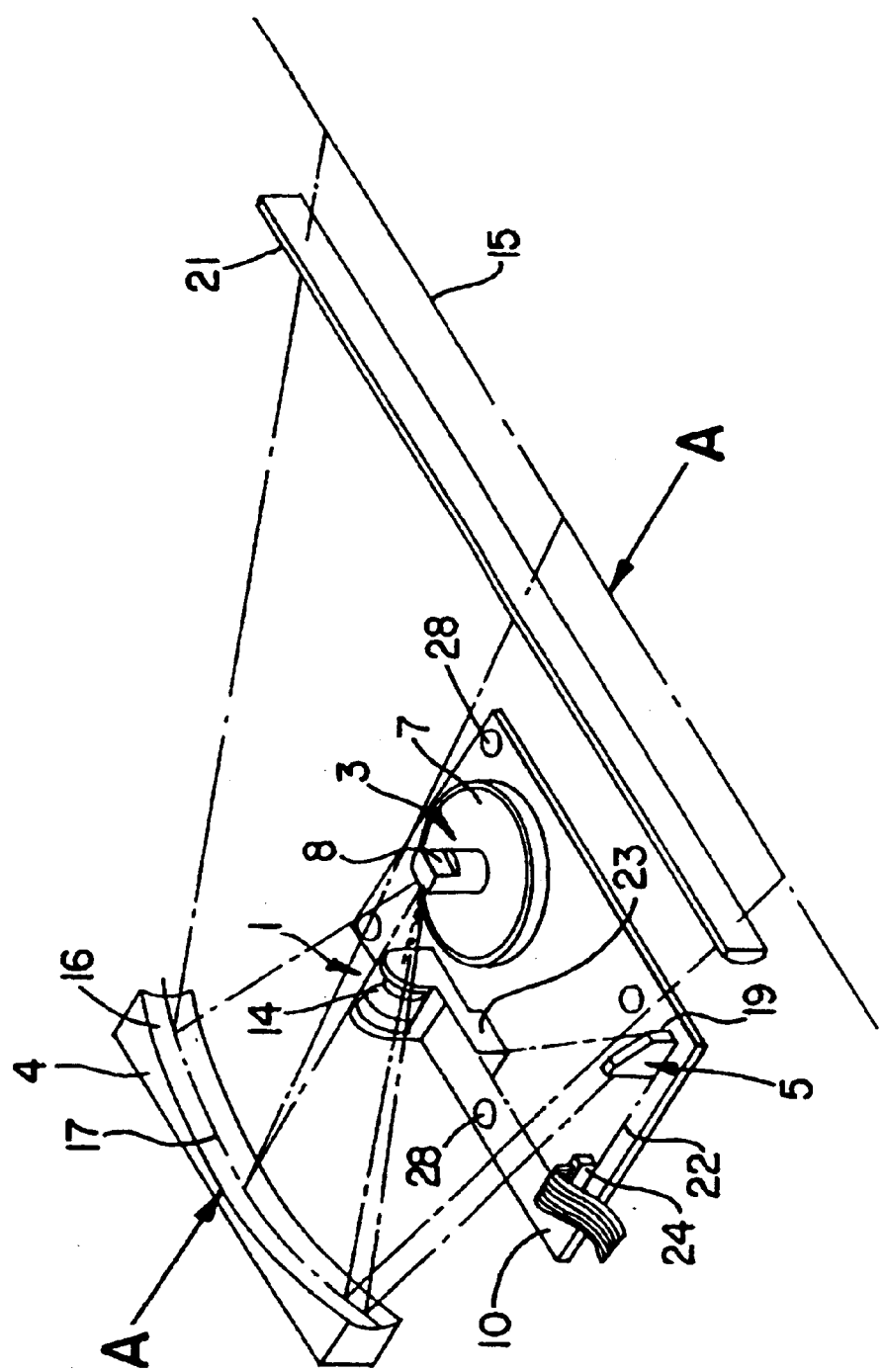
FIG. 3 illustrates a perspective view of one preferred embodiment of the compact optical system according to the current invention.

Referring now to the drawings, wherein like reference numerals designate corresponding structure throughout the views, and referring in particular to FIG. 3, a prospective view of one preferred embodiment of the compact optical system according to the current invention is illustrated. An image-forming light source 1 such as a laser light source and a rotatable image-reflecting surface 8 such a polygon mirror arc mounted on a single component board 10. The light source 1 is housed in a light source housing 14 and emits light towards the rotatable image-reflecting surface 8. The emitted light reaches the rotatable surface 8 which is continuously rotated at a high speed by a driving unit 7. The rotating surface 8 thus scans the light in a horizontal direction within a predetermined scanning angle towards an image-focusing element 4. The light source 1 is located on the component board 10 between the rotatable reflecting surface 8 and the image-focusing element 4. The light source 1 is also located within an area defined by the predetermined scanning angle of the rotatable reflecting surface 8. The predetermined scanning angle is defined to be a relative angular range of the rotatable reflecting surface 8 about its rotational axis for covering a predetermined horizontal scan distance on the intermediate image-forming surface. According to a second embodiment of the current invention, the light source is located on a line connecting the image-focusing element 4 and the rotatable reflecting surface 8.

Still referring to FIG. 3, an image focusing system includes the first image-focusing element 4 and a second image-focusing element 21 to form a focused image on an intermediate image-forming surface 15. The first image-focusing element 4 in the preferred embodiment is also termed as a fθ mirror, and the body is made of plastic while the surface is coated with aluminum. A surface 16 of the fθ mirror 4 has a predetermined curvature in both a scanning as well as a sub-scanning direction to serve as a light condenser. The scanning direction is a horizontal direction as indicated by a line 17 on the fθ mirror 4 while the sub-scanning direction is perpendicular to the scanning direction. The light condensing surface 16 thus reflects the scanned light towards the temporary image forming surface 15. The second image-focusing element 21 is located on the light path between the fθ mirror 4 and the intermediate image-forming surface 15. According to one preferred embodiment, the second image-focusing element 21 is a long semi-cylindrical lens having a predetermined curvature in the sub-scanning direction for correcting a distortion of an image in the sub-scanning direction which is caused by the rotatable image-reflecting surface 8.

In order to form a desirable image on the intermediate image-forming surface 15, a light is repeatedly scanned in the scanning direction while the rotatable image-reflecting surface 8 is being rotated. For each scanning cycle, a detection unit 5 also located on the component board 10 detects an onset of the horizontal sweep. As the rotatable reflecting surface 8 is rotated to a certain angle so that the scanned light reaches near one end of the first image-focusing element 4, the reflected light is detected by a photo-sensitive element in the detection unit 5. According to one preferred embodiment of the current invention, the single component 10 additionally includes an onset detection signal generation circuit 22 for generating an scan onset signal, a cable 23 for connecting the component board 10 to a control unit by sending and receiving signals such as the scan onset signal, and other components such as a light source control circuit for adjusting the intensity of the light source.

Figure 4:
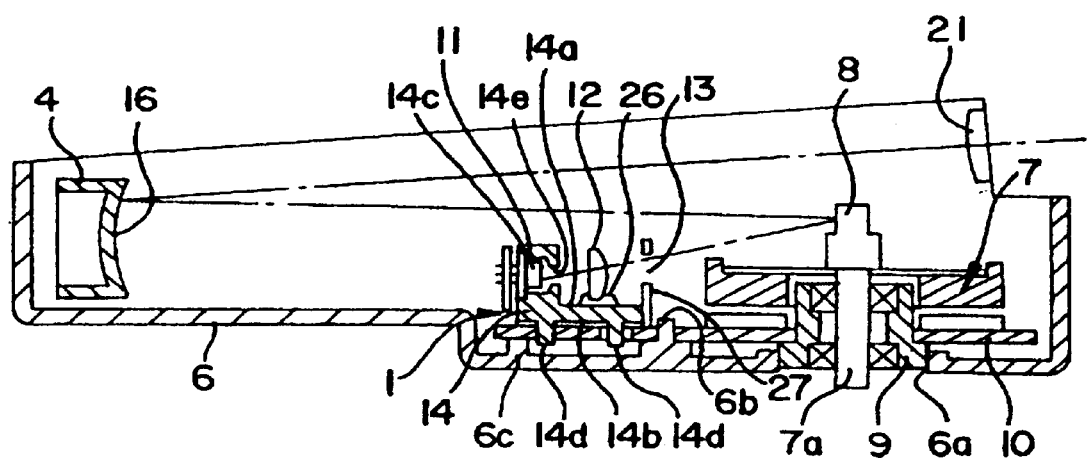
FIG. 4 illustrates a cross-sectional view of the preferred embodiment of the compact optical system as taken at a plane indicated by a line A—A of FIG. 3.

Now referring to FIG. 4, a cross sectional view of the above described preferred embodiment shows elements in a compact optical housing unit 6. The housing unit 6 houses the single component board 10, the components located on the component board 10 as described in reference to FIG. 3, the first image-focusing element 4 and the second image-focusing element 21. The component board 10 is mounted inside the housing unit 6 at board mounting portions 6a, 6b and 6c. As described above, the single component board 10 includes the light source 1 and the rotatable reflecting surface 8. The rotatable reflecting surface 8 is mounted on a drive shaft 6a of a motor 7. According to one preferred embodiment, the reflecting surface is provided on the drive shaft by cutting two surfaces parallel to its diameter. Further, the drive shaft housing 9 is fit in the single component board 10.

Figure 5:
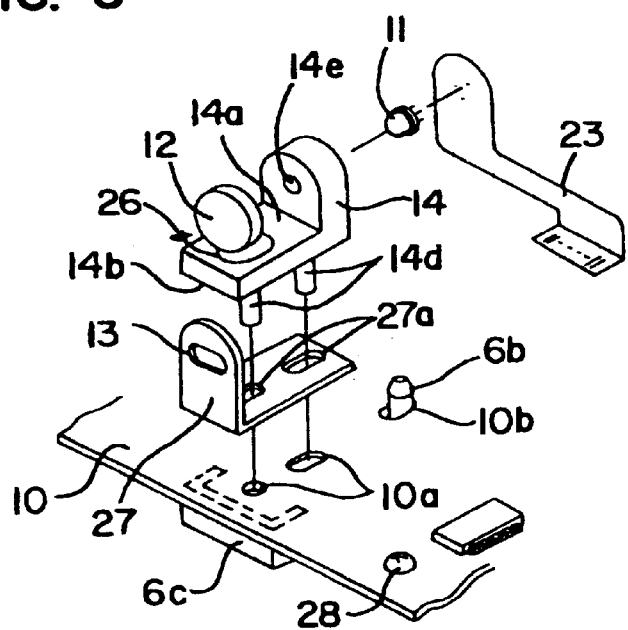
FIG. 5 illustrates a perspective view of detailed disassembled components of an image-forming light source used in a compact optical system according to the current invention.

Referring to both FIGS. 4 and 5, some detailed subcomponents of the light source 1 are respectively illustrated in a cross-sectional and prospective view. A laser generating unit 11 generates laser light in response to a laser control unit 23, and a collimator lens 12 on a holder 26 collimates the generated laser light in a substantially parallel rays of light. An aperture 13 of a predetermined size is formed on a front panel 27 and allows the passage of the light in a desired diameter. The above described sub-components of the light source 1 is housed in a light source housing 14a through 14e, and the housing attachment portions 14d of the light source housing 14 are mounted at the through holes 10a of the single board component 10. The front panel 27 is sandwiched between the light source housing 14 and the component board 10. The component board is in turn mounted on the housing board holding portions 6b and 6c, and the board is further screwed onto the housing by screws 28.

Referring back to FIG. 4, light travels from the light source 1 to the second focusing element 21 in a zigzag fashion. The first image-focusing element 4 is located near one side of the compact optical housing unit 6 while the second image-focusing element 21 is located near the other end of the housing 6 above the component board 10. The laser light from the light source 1 is emitted directly towards the rotatable reflecting surface 8 at a first predetermined vertical angle with respect to the component board 10. The reflecting surface 8 then reflects the light towards the image-condensing surface 16 of the first focusing element 4. The condensed light then travels toward the second image-focusing element 21 at a second predetermined vertical angle with respect to the component board 10. Because of the above light projection angles, the light is not interfered in its light path towards the intermediate image-forming surface during the image formation process. Furthermore, the image formation is accomplished by using a less space due to the above described topology of the components.

Now referring to FIG. 6, a prospective of the third embodiment of the compact optical system according to the current invention is illustrated. Since many components in the third embodiment are substantially similar to those described in reference to the above preferred embodiments, the description for these similar components are not reiterated here but incorporated herein by reference. The third preferred embodiment differs in the position of the light source 1 and a first image-focusing element 4'. Although the light source 1 is located on the single component board 10, the light source 1 emits light towards the first image-focusing element 4' which is located at a substantially same position with the above described first and second embodiments. In other words, the light source in the third embodiment is positioned to approximately 180□ from that of the first and second embodiments. More precisely speaking, the light is emitted towards a reflector portion 2 of the first image-focusing element 4'. The reflected light reaches the rotatable reflecting surface 8 for scanning the light in a scanning direction as already described above. The scanned light then reaches the light condensing surface 16' of the first image-focusing element 4' The condensed light travels towards an intermediate image-forming surface 15 through a second image-focusing element 21 to form a desirable image on the image-forming surface 15.

Still referring to FIG. 6A, according to one preferred embodiment, the reflector portion is located near the center of the image-focusing surface 16' and integrally formed on the surface 16'. To project the light to the reflector portion 2, the light source 1 is on a line connecting the center of the image-focusing element 4' and the rotatable reflecting surface 8. However, according to another embodiment, the reflector 2 is located slightly off the center of the image-focusing element 4', and accordingly, the light source 1 is located on the component board 10 between the rotatable reflecting surface 8 and the image-focusing element 4'. The position of the light source 1 is primarily determined by the position of the reflector portion 2 with respect to the image-focusing surface 16. Since the reflector located near the center of the image-focusing surface 16, an angle of incidence of the incoming light onto the rotatable image-reflecting surface is optimally minimized. Consequently, the size of the rotatable reflecting surface is also desirably minimized for a compact optical system. Furthermore, since the reflector 2 is integrally formed with the first-image focusing element 4', the reflector 2 neither requires additional space nor a complicated assembly process.

Figure 7:
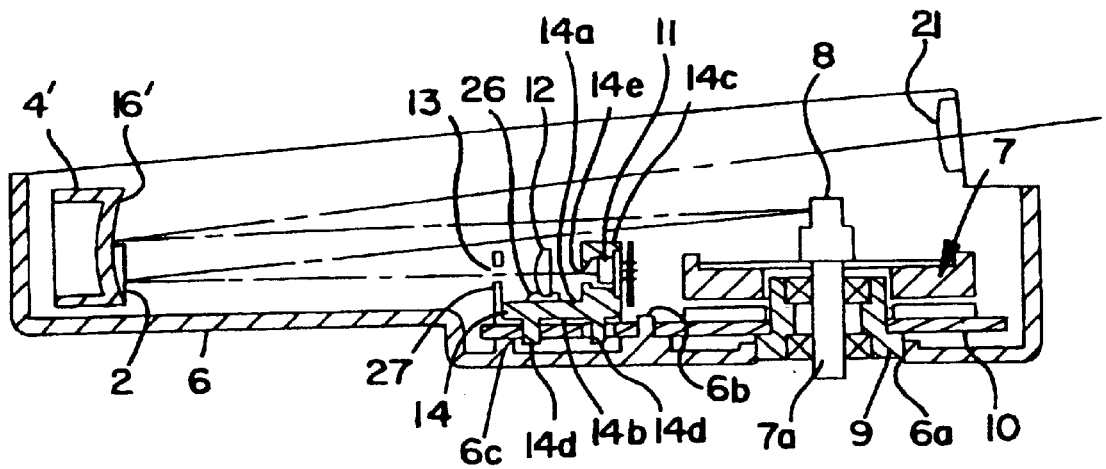
FIG. 7 illustrates a cross-sectional view of the preferred embodiment of the compact optical system as taken at a plane indicated by a line B—B of FIG. 6.

Now referring to FIG. 7, a cross-sectional view of the above described third embodiment of the compact optical system according to the current invention is illustrated. The description of the elements in the compact housing unit 6 are substantially the same as that for the first and second embodiments except for the reflector portion 2 and the additional light path associated with the reflector portion 2. As already described above, the light source 1 is positioned to emit light towards the reflector portion 2. The reflector portion 2 reflects the emitted light towards the rotatable reflecting surface 8. According to one preferred embodiment, the reflector 2 has a substantially flat surface as shown in solid line in FIG. 6B. According to another embodiment, the reflector 2 has a substantially curved surface as indicated in a dotted line also in FIG. 6B. Since the curved reflector 2 substantially eliminates a distortion of an image in the sub-scanning direction which is caused by the rotatable image-reflecting surface 8, the second image-focusing element 21 is not necessary in the compact optical system employing the curved reflector 2.

Figure 8:
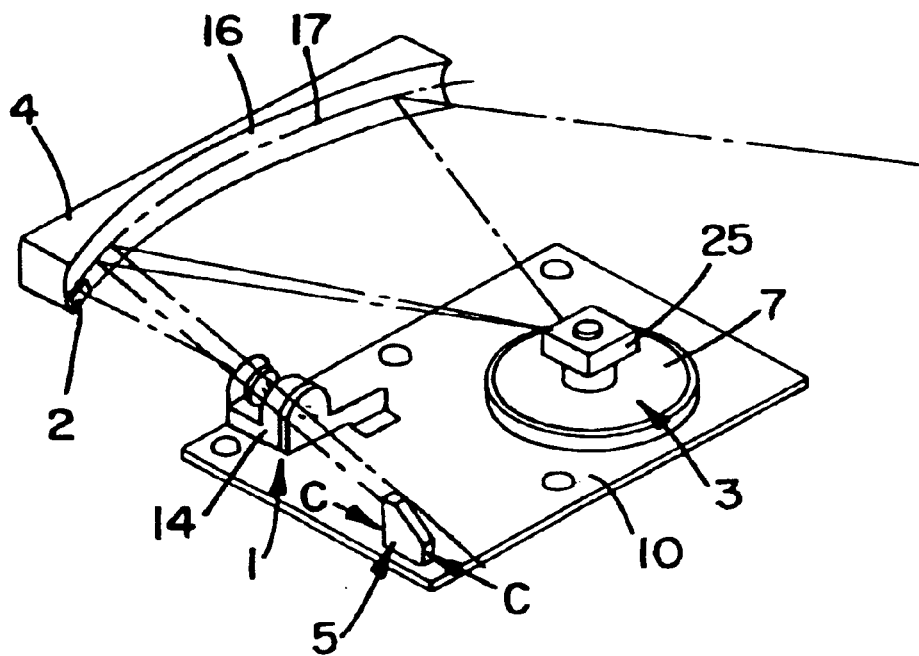
FIG. 8 illustrates a perspective view of yet another embodiment of the compact optical system according to the current invention.

Referring to FIG. 8, the fourth embodiment of the compact optical system according to the current invention is illustrated in a perspective view. The components of the fourth embodiments are substantially similar to the above described third preferred embodiment. However, in the fourth preferred embodiment, the light source is located in an area defined by the extent of the first image-focusing element 4 and the rotatable reflecting surface 25. In other words, one dimension of the above area is defined by a first distance between the first image-focusing element 4 and the rotatable reflecting surface 25, and the other dimension of the same defined area is the width of the first image-focusing element or the scanning distance at the first image-focusing element 4.

Figure 9:
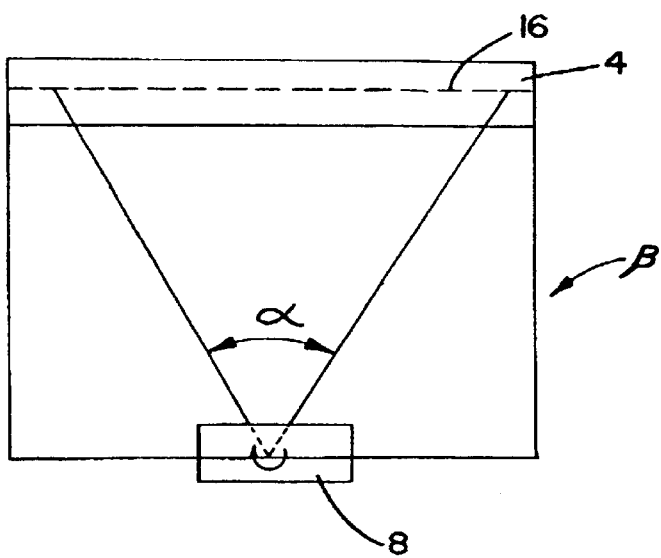
FIG. 9 diagrammatically illustrates a relation ship between a first area defined by a predetermined scanning angle of a rotating reflecting surface and a second area defined by the rotating reflecting surface and an image-focusing element.
Figure 1:
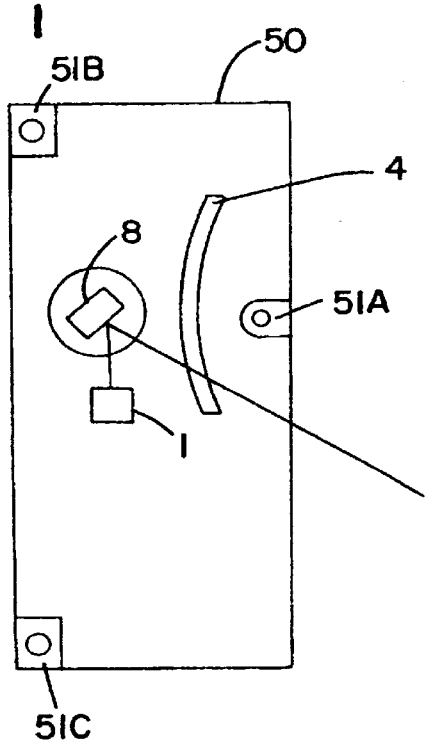
FIG. 1 diagrammatically illustrates a top view of a prior art optical system.
Figure 2:
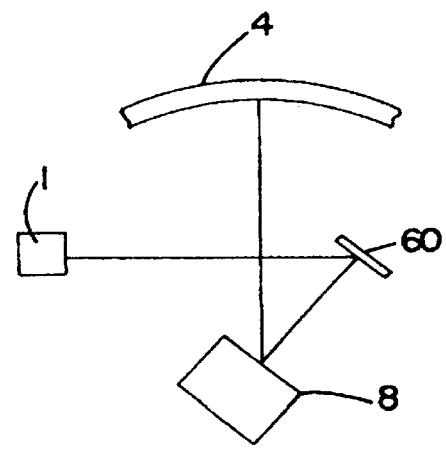
FIG. 2 diagrammatically illustrates a top view of another prior art optical system.

In order to visually specify the above defined rectangular area, briefly referring to FIG. 9, a predetermined angle of the rotatable reflecting surface 8 is designated by α, and a rectangular area β indicates the above defined rectangular area. In general, the rectangular area β includes the scanning area α and is generally larger than the scanning area α.

Referring back to FIG. 8, to accommodate the placement of the light source I in the vicinity of one corner in the above defined rectangular area β, a reflector portion 2 is placed near one end of the image-focusing element 4 at a predetermined angle to reflect the light towards the rotatable reflecting surface 25. The reflected light is then scanned by the rotatable reflecting surface 25 to form a desirable image. The reflecting surface 25 includes four individual surfaces, and each surface has the same predetermined scanning angle. As described above, the placement or topology of the components in the compact optical system according to the current invention is flexible without sacrificing the optimally minimal size of certain components.

Figure 10A:
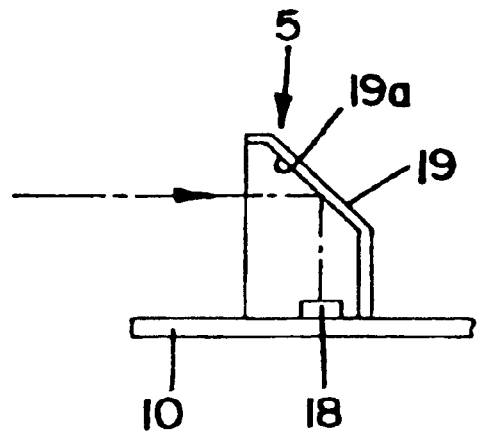
FIGS. 10A and 10B each illustrates a preferred embodiment in a cross-sectional view taken at a line C—C of a detection unit as shown in FIG. 8.
Figure 10B:
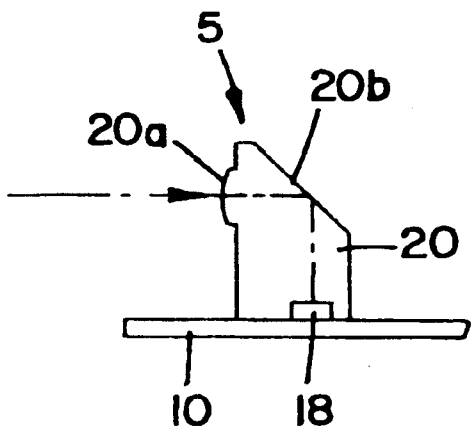

Now referring to FIGS. 10A and 10B, a cross-sectional view of two embodiments of a detection unit 5 is shown. The detection unit 5 is located on a component board 10 and determines the onset of each scanning cycle by detecting light reflected by a peripheral portion of the image-focusing element 4. Referring to FIG. 10A, one embodiment of the detection unit 5 includes a roof mirror 19a angularly located inside the slant portion 19 to guide the light towards a photo sensor 18. The roof mirror is made of a layer of aluminum coated on the inside wall 19. FIG. 10B shows another embodiment of the photo detection unit 5 which additionally includes a cylindrical lens 20a placed before the mirror 20b. The lens 20a is placed to accurately guide the light towards the mirror 20b and to the photo sensor 18 in case the light path is affected by a less-than perfect image-focusing element.

It is to be understood, however, that even though numerous characteristics and advantages of the present invention have been set forth in the foregoing description, together with details of the structure and function of the invention, the disclosure is illustrative only, and changes may be made in detail, especially in matters of shape, size and arrangement of parts, as well as implementation in software, hardware, or a combination of both within the principles of the invention to the full extent indicated by the broad general meaning of the terms in which the appended claims are expressed.

What is claimed is:

1. A method of projecting image-forming light onto a temporary image-forming surface via a rotatable image-reflecting surface and an image-focusing element, comprising the following steps of:

placing an image-forming light source in an area defined by an extent of the rotatable image-reflecting surface and an image-focusing element, said image-focusing element having a first curvature in a scanning direction and a second curvature in a sub-scanning direction;

placing a reflector portion on the image-focusing element, said reflector portion having a third curvature distinct from the first curvature and the second curvature;

projecting the image-forming light towards the reflector portion which reflects the image-forming light towards the rotatable image-reflecting surface;

scanning the image-forming light towards the image-focusing element while rotating the rotatable image-reflecting surface; and focusing the image-forming light reflected by the rotatable image-reflecting surface onto the temporary image-forming surface.

2. The method of projecting image-forming light onto a temporary image-forming surface according to claim 1 wherein in said image-forming light source placing step, said area is defined by a predetermined scanning angle about a rotational center of the rotatable image-reflecting surface.

3. The method of projecting image-forming light onto a temporary image-forming surface according to claim 2 wherein the image-forming light source is placed on a line between the rotational center of the rotatable image-reflecting surface and a center of the image-focusing element where the reflector portion is located.

4. The method of projecting image-forming light onto a temporary image-forming surface according to claim 3 wherein the reflector portion and the rotatable image-reflecting surface reflect the image-forming light at a respective predetermined angle in a vertical direction so as to prevent the reflected image-forming light from interfering with each other.

5. The method of projecting image-forming light onto a temporary image-forming surface according to claim 1 wherein in said image-forming light source placing step, the image-forming light source is placed outside a second area defined by a predetermined scanning angle about a rotational center of the rotatable image-reflecting surface.

6. The method of projecting image-forming light onto a temporary image-forming surface according to claim 1 wherein in said reflector portion placing step, the reflector portion is located near one end of the image-focusing element.

7. The method of projecting image-forming light onto a temporary image-forming surface according to claim 1 wherein said scanning step is repeated for horizontal sweeps and for each sweep said scanning step further comprises a step of detecting a beginning of each sweep of said scanning.

8. A compact optical system for projecting image-forming light onto a photoreceptive drum surface, comprising:

a fθ mirror having a first curvature in a scanning direction and a second curvature in a sub-scanning direction for focusing the image-forming light so as to form an image on the photoreceptive drum surface, the image-focusing element also having a reflector portion having a third curvature for reflecting the image-forming light, said third curvature being distinctively shaped from said first curvature and said second curvature;

a rotatable polygon mirror located near said fθ mirror for reflecting the image-forming light towards said fθ mirror and for scanning the image-forming light towards said fθ mirror while said polygon mirror is being rotated; and an image-forming light source located in an area defined by an extent of said rotatable polygon mirror and said fθ mirror for emitting the image-forming light towards said reflector portion which reflects the image-forming light towards said polygon mirror.

9. The compact optical system for projecting image-forming light onto a photoreceptor drum surface according to claim 8 wherein said image-forming light source is placed in said area defined by a predetermined scanning angle about a rotational center of said polygon mirror.

10. The compact optical system for projecting image-forming light onto a photoreceptor drum surface according to claim 8 wherein said image-forming light source is placed on a line between the rotational center of said polygon mirror and a center of said scanning angle of said fθ mirror where the reflector portion is located.

11. The compact optical system for projecting image-forming light onto a photoreceptor drum surface according to claim 10 wherein said reflector portion and said polygon mirror reflect the image-forming light at a respective predetermined angle in a vertical direction so as to prevent the reflected image-forming light from interfering with each other.

12. The compact optical system for projecting image-forming light onto a photoreceptor drum surface according to claim 8 wherein said image-forming light source is placed outside a second area defined by a predetermined scanning angle about a rotational center of said polygon mirror.

13. The compact optical system for projecting image-forming light onto a photoreceptor drum surface according to claim 12 wherein said fθ mirror has two horizontal ends, said reflector portion being located near one of said horizontal ends of said fθ mirror.

14. The compact optical system for projecting im age-forming light onto a photoreceptor drum surface according to claim 12 wherein said polygon mirror repeatedly scans the image-forming light in a predetermined horizontal direction.

15. The compact optical system for projecting image-forming light onto a photoreceptor drum surface according to claim 14 further comprising a scan onset detection unit located near said fθ mirror, as said polygon mirror initiates a scan, said scan onset detection unit detecting a beginning of the scan of the image-forming light onto the photoreceptor drum surface.

16. An image-focusing element used in a compact optical system, comprising:

a curved image-focusing surface for forming an image on a predetermined surface in response to an incoming image-forming light, said curved image-focusing surface having a first surface shape; and a separate reflector portion mounted on the curved image-focusing surface for directly reflecting the incoming image-forming light in a predetermined direction, said separate reflector portion having a second surface shape that is different from said first surface shape, said separate reflector portion being located substantially at a center of said image-focusing surface.

17. A single component board used in a compact optical system, comprising:

a rotatable image-reflecting surface located on the single component board for reflecting an image-forming light so as to scan the image-forming light within a predetermined scanning angle while rotating said rotatable image-reflecting surface;

an image-focusing element having a reflector portion and located on the single component board for focusing the image-forming light reflected by said rotatable image-reflecting surface, said reflector portion of said image-focusing element further including a curved image-focusing surface with a first surface shape and a separate reflector portion mounted on the curved image-focusing surface for directly reflecting the incoming image-forming light in a predetermined direction, said reflector portion having a second surface shape that is different from said first surface shape; and an image-forming light source located on the single component board in an area defined by said predetermined scanning angle for initially projecting the image-forming light towards said reflector portion on said image-focusing element, said reflector portion reflecting the image-forming light towards said rotatable image-reflecting surface;

wherein said rotatable image-reflecting surface, said image focusing element and said image-forming light source on the single component board as positioned substantially on the same plane.

* * * * *